United States Patent [19]

Hamada et al.

[11] 4,150,842
[45] Apr. 24, 1979

[54] FRONT SUSPENSION FOR A MOTOR VEHICLE

[75] Inventors: Makoto Hamada; Hiroyuki Watanabe, both of Toyota, Japan

[73] Assignee: Toyota Jidosha Kogyo Kabushiki Kaisha, Toyota, Japan

[21] Appl. No.: 777,666

[22] Filed: Mar. 15, 1977

[30] Foreign Application Priority Data

Dec. 23, 1976 [JP] Japan .......................... 51-173327[U]

[51] Int. Cl.² ............................................. B62D 17/00
[52] U.S. Cl. ..................................... 280/661; 296/204
[58] Field of Search ........... 280/689, 661, 673, 106 R, 280/660, 96.1; 296/28 R; 267/66

[56] References Cited

U.S. PATENT DOCUMENTS

| 2,115,915 | 5/1938 | McCain | 280/661 |
| 3,125,332 | 3/1964 | Péras | 280/673 |
| 3,256,028 | 6/1966 | Fehlberg | 280/661 |
| 3,819,202 | 6/1974 | Castoe | 280/661 |
| 4,046,415 | 9/1977 | Klees | 280/106 R |

Primary Examiner—Joseph F. Peters, Jr.
Assistant Examiner—John A. Carroll
Attorney, Agent, or Firm—Koda and Androlia

[57] ABSTRACT

A front suspension for motor vehicles of the type having lower suspension arms. The front suspension includes a strut bar bracket provided to the rear of the lower suspension arm and coupled at at least two points to a longitudinal member of the motor vehicle extending in a direction of the length of the motor vehicle and coupled at at least one point to a rear support cross member of the motor vehicle and a strut bar fixed at one end to the lower suspension arm and coupled at the other end to the strut bar bracket by a threaded bolt for adjusting the length of the strut bar along the axis of the strut bar between the lower suspension arm and the strut bar bracket.

6 Claims, 4 Drawing Figures

FRONT SUSPENSION FOR A MOTOR VEHICLE

BACKGROUND OF THE INVENTION

1. Field of Invention

This invention relates to motor vehicle front suspensions and particularly to motor vehicle front suspensions provided with strut bars which are connected to a lower suspension arm and which extend to a position rearward of the lower suspension arm.

2. Prior Art

Conventionally, the body side ends of the strut bars of a front suspension have been supported by front side members or by brackets welded to the front side members. Even when bracket supports are utilized, the rigidity and strength of the fitting is not sufficient. Furthermore, it has not been possible in the prior art front suspensions to freely alter the length of the strut bar between the lower suspension arm and the point of support on the body for the strut bar. This lack of adjustment has created difficulties by limiting the degree of freedom of the suspension and the degree of freedom in the structural layout of the body.

This invention has been designed to eliminate the above mentioned conventional drawbacks.

SUMMARY OF THE INVENTION

Accordingly, it is a general object of the present invention to provide a front suspension for a motor vehicle which increases the rigidity and the strength of the strut bar support which is attached to the body of the motor vehicle.

It is another object of the present invention to provide an automobile front suspension wherein the length of the strut bar can be freely adjusted.

It is yet another object of the present invention to provide a front suspension which strengthens the body of the motor vehicle and reduces the transmission of engine noise and vibration.

In keeping with the principles of the present invention, the objects are accomplished by a unique front suspension for motor vehicles of the type having lower suspension arms. The front suspension includes a strut bar bracket provided to the rear of the lower suspension arm and coupled at at least two points to a longitudinal member of the motor vehicle extending in a direction of the length of the motor vehicle and coupled at at least one point to a rear engine support cross member of the motor vehicle and a strut bar fixed at one end to the lower suspension arm and coupled at the other end to the strut bar bracket by a means for adjusting the length of the strut bar along the axis of the strut bar between the lower suspension arm and the strut bar bracket.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
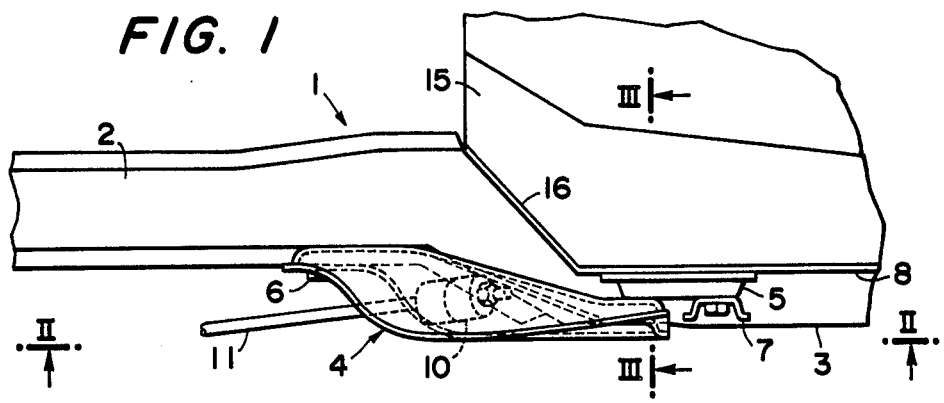
FIG. 1 is a side view of a front suspension in accordance with the teachings of the present invention.
Figure 2:
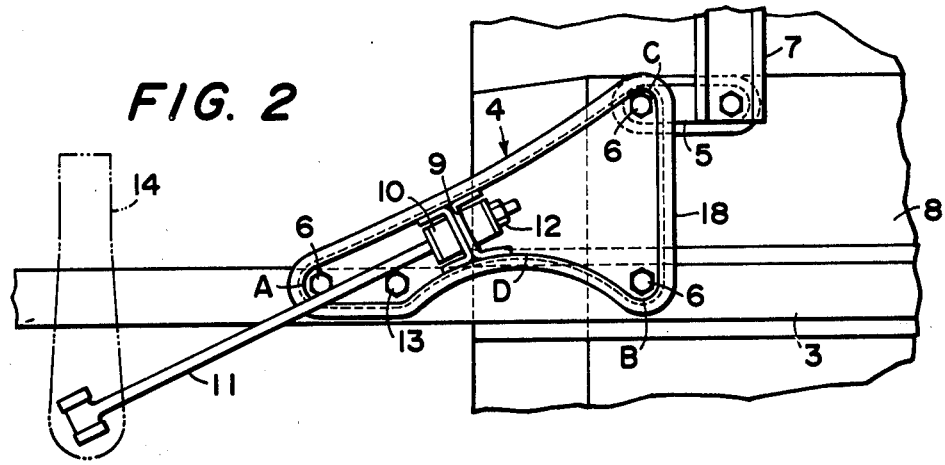
FIG. 2 is a view of FIG. 1 as indicated by the arrows from the line II—II.

Referring more particularly to the drawings, FIG. 1 is a side view of the essential parts of an automobile front suspension in accordance with the teachings of the present invention and FIG. 2 is a view in the direction indicated by the arrows from the line II—II in FIG. 1. As shown in FIGS. 1 and 2, the front suspension includes a strut bar bracket 4 fastened to the under side of a front member 2 and to a floor side member 3 which together form a longitudinal member 1 of the motor vehicle underbody. The strut bar bracket 4 is in the form of an irregular dish plate which is attached so that the dish faces downward. The horizontal shape of the strut bar bracket 4 is roughly triangular. The strut bar bracket 4 is fastened by means of attachment bolts 6 to the underside of front side member 2 adjacent vertex A, to the underside of floor side member 3 adjacent vertex B and to the underside of bracket 5 adjacent vertex C. Bracket 5 supports one end of rear engine support cross member 7 and is fastened to floor pan 8.

Strut bar bracket 4 includes an indented portion D which is indented between vertices A and B toward the side AC. The strut bar bracket 4 further includes an integral strut bar support member 9 located between side AC and indented portion D and is in the center of the three vertices A, B and C. The strut bar support member 9 consists of two plates whose cross sectional shapes resemble a square-cornered U and which are welded back to back. The member 9 supports one end of the strut bar 11 via a rubber cushion 10 through which the strut bar 11 is passed. The relative length of the strut bar 11 which extends from the strut bar support member 9 to a lower suspension arm 14 can be adjusted in the axial direction of strut bar 11 by means of an adjustment nut 12 threaded onto the end of strut bar 11.

The vertices A and C of the strut bar bracket 4 are located so that the line connecting the two vertices A and C is almost parallel to the axis of strut bar 11. Furthermore, as shown in FIG. 2, the strut bar bracket 4 is fastened to the underside of front side member 2 by attachment bolts 13 at vertex A. The vehicle underbody further includes a tunnel 15 through which the drive shaft passes and a floorboard 16.

Figure 3:
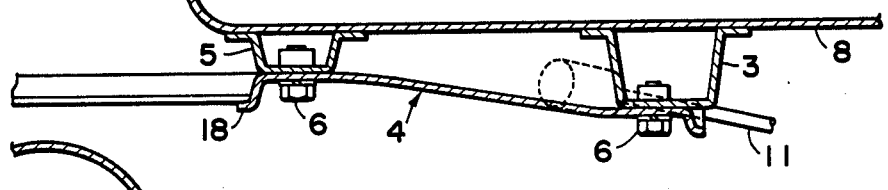
FIG. 3 is a magnified cross section along the lines III—III in FIG. 1.
Figure 4:
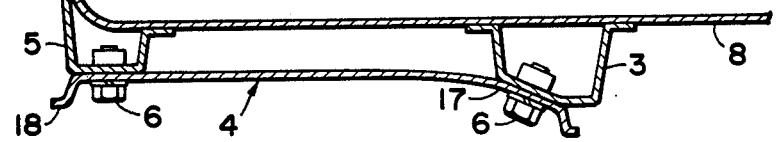
FIG. 4 is a cross section illustrating a modification of the elements shown in FIG. 3.

As shown in FIG. 3, the floor side member 3 and the bracket 5 are normally located at different heights relative to the floor pan 8. Accordingly, the strut bar bracket 4 is deformed to facilitate attachment. If it should prove difficult, however, to form the strut bar bracket 4 in this manner, it is also possible to simplify the structure of the strut bar bracket 4 by forming an incline surface 17 which faces down and inward on the underside of the floor side member 3 (as shown in FIG. 4). A flange 18 is formed along the underside of the rim of the strut bar bracket 4. However, if the strut bar bracket 4 is sufficiently strong, the flange 18 is not necessary.

In the above described embodiment, the strut bar bracket 4 is supported at two points on the front side member 2 and at one point on the floor side member 3 and at one point on the bracket 5. Accordingly, the weak portion of the flange where the front side member 2 and the floor side member 3 are connected is strengthened. Furthermore, the bracket 5 which supports the rear engine support cross member 7 is integrally connected via the strut bar bracket 4 to the highly rigid floor side member 3 and front side member 2 so that the transmission of engine vibration is limited and the noise reduced. Furthermore, the portion of the frame which extends from the front side member 2 to the floor side member 3 is normally bent either in a vertical or lateral direction due to body layout considerations. In this case, the strut bar bracket 4 also serves to strengthen this bent portion of the frame. In addition, the length of the strut bar can be freely adjusted by means of the nut 12 on the end of strut bar 11.

Even though in the above described embodiment, the strut bar bracket 4 is supported at four points, in cases where it is not necessary to strengthen the connecting or bent portion of the frame between the side member 2 and the floor side member 3 by means of the strut bar bracket 4, it would be possible to support the strut bar bracket 4 at three points. The three points would consist of two points on the longitudinal member 1 comprised by the front side member 2 and the floor side member 3 and one point on a part which is integrally connected with the rear engine support cross member 7.

From the above description, it should be apparent that a front suspension in accordance with the teachings of the present invention has certain superior characteristics over the prior art. These characteristics include the following: (a) the rigidity of the member which supports the rear end of the strut bar is increased, (b) engine vibration noise is reduced, (c) the length of the strut bar between the lower suspension arm and the point of support on the body end of the bar can be freely adjusted and (d) the degree of freedom of the suspension and the degree of freedom in the structural layout of the body are greatly increased since the length of the strut bar is adjustable.

It should be apparent to one skilled in the art that the above described embodiment is merely illustrative of but one of the many possible specific embodiments which can represent the applications of the principles of the present invention. Numerous and various other arrangements can be readily devised by those skilled in the art from those principles without departing from the spirit and scope of the invention.

We claim:

1. A support structure for the strut bar of a motor vehicle front suspension of the type including lower suspension arms, said support structure comprising:
   a strut bar bracket provided to the rear of said lower suspension arm and coupled to said motor vehicle at at least two points of a front side member and a floor side member of said motor vehicle and at least one point of a rear support cross member of an engine of said motor vehicle, said strut bar bracket extending over a connecting portion between said front side member and said floor side member and connected to both of said members;
   a strut bar fixed at one end to said lower suspension arm and extending toward said strut bar bracket; and
   an adjustable means for coupling a portion of the strut bar remote from said one end to said strut bar bracket whereby the length of said strut bar may be varied.

2. A support structure according to claim 1 wherein said strut bar bracket is of generally triangular dish shape.

3. A support structure according to claim 2 wherein said adjustable means comprises a support member fixed to said strut bar bracket, a threaded end of said strut bar extending through a hole in said support member and an adjustment nut threaded onto said threaded end.

4. A support structure according to claim 3 wherein said support member is coupled to said strut bar bracket at a point substantially equidistant from the vertices of the triangularly shaped strut bar bracket.

5. A support structure according to claim 4 wherein said strut bar bracket is coupled to said rear support cross member by a longitudinal bracket provided on a floor pan member of said motor vehicle.

6. A support structure according to claim 1 wherein said strut bar bracket is further coupled to said front side member at a second point.

* * * * *